Patented July 11, 1950

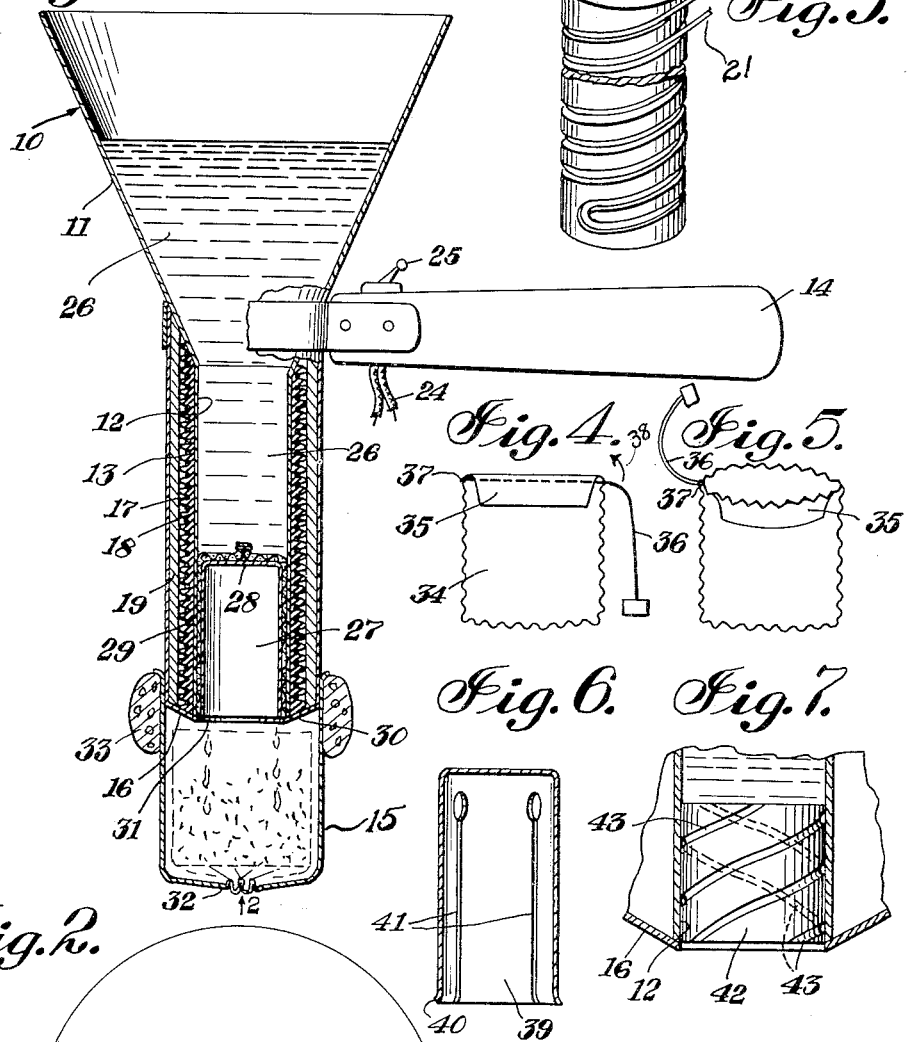

2,514,360

UNITED STATES PATENT OFFICE 2,514,360

FLUID HEATING DEVICE

Octavio Jose Alvarez, New York, N. Y., assignor, by mesne assignments, of three-fourths to Octavio J. Alvarez and one-fourth to Maria De Reitzes-Marienwert, both of New York, N. Y.

Application March 27, 1946, Serial No. 657,514

3 Claims. (Cl. 219—39)

My present invention relates to utensils and more particularly to cooking devices for boiling water and making coffee or tea.

It is an object of my present invention to provide a utensil with which it is possible to produce a continuous flow of boiling water.

Another object of my present invention consists in a device for making coffee or tea in which the container in which the heated boiling water is produced is separated from the container holding the coffee or tea so as to avoid the necessity of cleaning the boiling water producing container each time after making coffee or tea.

Still another object of my present invention consists in a utensil by which it is possible to obtain in a very simple and efficient way and without any loss of time a continuous stream of a very hot water mixture.

Still a further object of my present invention consists in a utensil for heating water which is combined with a receptacle for a foodstuff in such a manner that this receptacle itself is not heated while the hot water is dripping from the heated utensil onto the foodstuff arranged in said receptacle.

With the above objects in view, my present invention consists mainly of a utensil comprising in combination a container having a relatively small opening at its bottom, a tubular member having two open ends and secured at its one open end to the above mentioned container at the bottom thereof in such a manner that fluid contained in this container can flow through the mentioned bottom opening into this tubular member, and heating means secured to this tubular member and surrounding the same so as to be adapted to heat this tubular member and the fluid flowing through it.

It is evident that during use such a utensil has to be arranged so that the mentioned container is at the top and the tubular member projects vertically downward from the container bottom. If the utensil is held in this position and filled with water or another fluid, this fluid will flow through the tubular member and will be heated during its passage through this member. Thus, it will leave the tubular member at its bottom end in heated condition.

In accordance with a preferred embodiment of my present invention, I provide at and near the bottom end of the above mentioned tubular member means for retarding and slowing down the flow of liquid through this tubular member; these means are preferably constructed so as to distribute the fluid along the inner surface of the wall of the tubular member. In this way, it is possible to always preheat the fluid while it is flowing through the upper portion of the tubular member and to heat it thereafter quickly to the desired temperature while it is flowing through the lower portion of the tubular member.

I have found it advisable to construct my utensil in such a manner that it consists of an at least substantially funnel-shaped container having a tubular container part which is open at its bottom end; this container is combined with an electrical heating coil secured to the container so as to surround the tubular part thereof, and with means simultaneously distributing and slowing down the flow of fluid through this tubular container part; these latter means are preferably arranged at and near the open bottom end of the above mentioned tubular part of the container.

I might combine with a utensil of the above described type a receptacle removably attached to the tubular container part mentioned above at the open bottom end thereof so that the heated fluid, e. g. boiling water, drips through the open bottom end of the tubular container part into this receptacle on a foodstuff, e. g. coffee or tea, arranged therein.

The above mentioned heating means consist preferably of an electrical heating coil surrounding the tubular container part from its top to its bottom end so as to heat the fluid, e. g. water, passing through this tubular container part; this electrical heating coil is of course connected with an electrical circuit and combined with a switch by means of which it can be connected with this circuit and disconnected therefrom, whenever desired.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a vertical section along line 1—1 of Fig. 2 through a utensil of the type proposed by me;

Fig. 2 is a bottom view of the utensil shown in Fig. 1 seen in direction of arrow 2 with the receptacle containing the foodstuff removed;

Fig. 3 is a perspective view of the heating element for heating the tubular container part of the utensil shown in Figs. 1 and 2;

Fig. 4 is a front view of a bag for foodstuff to be placed into the receptacle shown in Fig. 1 at the bottom of the utensil, in closed position;

Fig. 5 is a perspective view of the bag shown in Fig. 4, in open position;

Fig. 6 is a vertical section through a modified embodiment of the tubular member forming part of the flow retarding means mentioned above; and Fig. 7 is a partial side view, partly in section, of the bottom portion of a utensil equipped with distributing means.

The utensil shown in Fig. 1 consists mainly of a funnel-shaped container 10 composed of a conical container part 11 and a tubular container part 12, a heating device 13 surrounding the tubular container part 12 and secured to the container 10, a handle 14 secured to the conical container part 11, and a receptacle 15 removably attached to the lower end 16 of the tubular container part 12 and the heating device 13 surrounding the same.

As clearly shown in the drawings, particularly in Figs. 1 to 3, the heating device 13 consists of an electrical wire coil 17 embedded between two insulating cylindrical members 18 and 19 consisting preferably of an electrically non-conducting plastic, e. g. ceramic, material.

From the point of view of the present invention it is important that both ends 20 and 21 of the wire coil 17 are located at the top end of the electrical wire coil 17. In order to make this possible, the wire coil forms a double spiral as clearly shown in Fig. 3, i. e. there is no free wire end at the bottom of the heating device but the wires forming the double wire spiral form at the bottom of the coil a wire loop 22. Of course, the groove 23 in the insulating cylindrical member 18, in which the wire coil 17 is arranged, is shaped accordingly, i. e. also forms a loop at the bottom of the heating device.

The two wire ends 20 and 21 at the upper end of the wire coil 17 reach into the handle 14 and are there connected with the electrical conductors in the electric cord 24. Switch 25 serves for connecting the electrical coil with the conductors in the electrical cord 24 and disconnecting it therefrom, whenever desired. Thus, the electrical arrangement for heating the tubular container portion 12 can be simply operated by turning switch 25.

In accordance with my present invention, I provide, as mentioned above, in the tubular container part 12 at and near the bottom end thereof means for distributing the fluid, e. g. water 26, flowing from the conical container part 11 into and through the tubular container part 12. These distributing means are constructed so as to simultaneously retard, i. e. slow down the flow of water.

In the embodiment shown in Figs. 1 and 2, these retarding and distributing means consist of the tubular member 27 which is closed at its top 28 and has an outer diameter which is only slightly smaller than the inner diameter of the tubular container part 12. A sack-shaped filter member 29 consisting preferably of textile material is pulled over the tubular member 27 and arranged between the same and the inner surface of the tubular container part 12 as clearly shown in Fig. 1.

In order to prevent unintentional removal and falling out of the sack-shaped filter member 29 and the tubular member 27, the bottom wall 30 of the tubular container part 12 projects slightly inward as indicated by numeral 31 so as to hold the filter member 29 in its position shown in Fig. 1.

As mentioned above, I arrange at the bottom of the tubular container part 12 the detachable receptacle 15 which is open at its top and has a small opening 32 at its bottom. This receptacle is shaped so that it can be slipped over the heating device 13 and is held by friction in the position shown in Fig. 1.

This receptacle 15 is surrounded at its top by a cork or similar ring 33 firmly secured thereto; this ring serves for holding the receptacle when it is hot.

The foodstuff to be treated, e. g. to be mixed with hot water, is arranged in the receptacle 15 preferably in a bag of the type shown in Figs. 4 and 5. This bag 34 consists of a water permeable material. In Fig. 4 this bag is shown in closed position, i. e. with the cover 35 sticking to the front wall of the bag. In order to facilitate opening of this bag 34, the string 36 is secured at 37 to the bag and passes, as shown in Fig. 4, under the cover 35. If this string 36 is pulled in direction of arrow 38, the bag opens as shown in Fig. 5. This open bag is then placed into receptacle 15, as shown in Fig. 1.

My new utensil is operated as follows:

First, the bag containing the foodstuff, e. g. coffee or tea, is opened as shown in Figs. 4 and 5 and placed into receptacle 15 which is removed for this purpose from the utensil.

Then, the receptacle together with the bag containing the foodstuff is slipped over the bottom portion of the tubular container part 12 into the position shown in Fig. 1.

Thereafter, switch 25 is turned so as to connect the heating element 13 with the electric cord 24 and a source of electric current. This results in heating of the tubular container part 12.

Finally, fluid, e. g. water, is poured into the conical container part 11 until the same is nearly filled.

The water will then slowly flow through the annular space between the tubular member 27 and the inner surface of the tubular container part 12 and drip into the receptacle 15, as shown in Fig. 1. During its flow through the tubular container part 12, the water is heated: in the upper part of the tubular container part the water is slowly preheated and during its flow through the annular space between the tubular member 27 and the tubular container portion 12 the water is quickly heated to the desired temperature so that it is actually boiling when leaving the tubular container part 12 at the open bottom end thereof.

Thus, it is possible to obtain with a utensil of the above described type a continuous supply of dripping boiling water which is actually so hot that it is mixed with steam.

In Fig. 6 I have shown a modified tubular member 39 which is similar to the tubular member 27 shown in Fig. 1 but shaped so as not to require any projecting wall portion 31 at the bottom of the tubular container part 12. This modified tubular member 39 is provided with an outward bent bottom edge 40 adapted to press against the inner surface of the tubular container part 12 and thus to hold the tubular member 39 and the filter bag 29 slipped over it in proper operative position.

This tubular member 39 is furthermore provided with slots 41 so as to enable passage of the heated water into the tubular member 39, thus increasing the supply of boiling water.

The modified distributing means shown in Fig.

7 do not comprise any filter bag at all: A preferably solid metallic, plastic or ceramic cylindrical plug 42 is used instead of the filter 29 and the tubular member 27 or 39. This cylindrical plug 42 is provided with several spiral grooves 43 reaching from the top to the bottom of member 42. Since this member 42 tightly fits into the tubular container part 12, the preheated fluid has to flow through these grooves 43 in order to reach the bottom end of the tubular container part 12. During its passage through these grooves the fluid is quickly heated to the required temperature. On the one hand, this is due to the fact that only a small amount of fluid is passing through these grooves, and on the other hand to the fact that the cylindrical plug 42 is also heated and thus aids in heating the fluid passing through the grooves.

It will be understood that each of the elements described above, or two or more together, may also find a useful application in other types of utensils differing from the types described above.

While I have illustrated and described the invention as embodied in utensils for preparing coffee or tea, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. A fluid heating device comprising in combination a substantially funnel-shaped container having a tubular container part being open at its bottom end; electrical heating means secured to said substantially funnel-shaped container surrounding said tubular container part so as to be adapted to heat fluid flowing through the same; distributing means arranged within said tubular container part at and near said open bottom end of the same; a receptacle being entirely open at its top and having at least one small opening at its bottom, said receptacle being removably attached to said tubular container part at said open bottom end thereof so that fluid heated during its flow through said tubular container part drips into said receptacle when leaving said tubular container part through said open bottom end thereof; and a bag-shaped member consisting of a water permeable material and being open at its top, said bag-shaped member being arranged within said receptacle in such a manner that its open end is facing said open bottom end of said tubular container part.

2. A fluid heating device comprising in combination a substantially funnel-shaped container having a tubular container part being open at its bottom end; electrical heating means secured to said substantially funnel-shaped container surrounding said tubular container part so as to be adapted to heat fluid flowing through the same; a tubular water impermeable member being closed at its top and having an outer diameter being slightly smaller than the inner diameter of said tubular container part, said tubular member being inserted in said tubular container part at the bottom end thereof so as to form an annular space between its outer cylindrical surface and the inner surface of said tubular container part; and a tubular water permeable filter member inserted in said annular space between said outer cylindrical surface of said tubular member and said inner surface of said tubular container part so as to slow down the flow of fluid through said tubular container part.

3. In a fluid heating device, a vertically extending tubular container being open at its top and at its bottom; an electrical heating coil constructed and arranged so as to surround said vertically extending tubular container; distributing means consisting of a tubular water impermeable member being closed at its top and having an outer diameter being slightly smaller than the inner diameter of said tubular container, said member being inserted in said tubular container so as to form an annular space between its outer cylindrical surface and the inner surface of said tubular container near the bottom end thereof; and a water permeable filter tube inserted in said annular space between said outer cylindrical surface of said tubular member and said inner surface of said tubular container.

OCTAVIO JOSE ALVAREZ.

REFERENCES CITED

The following references are of record in the file of this patent:

UNITED STATES PATENTS

| Number | Name | Date |
|---|---|---|
| 647,145 | Meyer | Apr. 10, 1900 |
| 799,798 | Morrison | Sept. 19, 1905 |
| 1,381,500 | Reader | June 14, 1921 |
| 1,627,335 | Midulla | May 3, 1927 |
| 1,652,409 | Moulthrop | Dec. 13, 1927 |
| 1,780,426 | Hyde | Nov. 4, 1930 |
| 1,932,406 | Harris | Oct. 31, 1933 |
| 2,292,504 | Bennett | Aug. 11, 1942 |

FOREIGN PATENTS

| Number | Country | Date |
|---|---|---|
| 433,803 | France | Nov. 6, 1911 |